United States Patent [19]

Ueta et al.

[11] Patent Number: 5,581,453
[45] Date of Patent: Dec. 3, 1996

[54] POWER SUPPLY WITH SWITCHED STARTING CIRCUIT

[75] Inventors: Mitsunori Ueta, Osaka; Takeo Koyama, Gifu, both of Japan

[73] Assignee: Matsushita Electric Industrial Co., Ltd., Osaka, Japan

[21] Appl. No.: 292,428

[22] Filed: Aug. 18, 1994

[30] Foreign Application Priority Data

Oct. 28, 1993 [JP] Japan .................................. 5-270615

[51] Int. Cl.$^6$ .................................................. H02M 7/517
[52] U.S. Cl. ................................ 363/49; 363/21; 363/97; 363/131
[58] Field of Search ................................ 363/18, 19, 20, 363/21, 49, 97, 131

[56] References Cited

U.S. PATENT DOCUMENTS

| | | | |
|---|---|---|---|
| 4,030,024 | 6/1977 | Chambers et al. | 363/49 |
| 4,272,805 | 6/1981 | Iguchi et al. | 363/19 |
| 4,370,701 | 1/1983 | Western | 363/20 |
| 4,486,822 | 12/1984 | Marinus | 363/19 |
| 4,692,853 | 9/1987 | de Sartre et al. | 363/49 |
| 4,695,936 | 9/1987 | Whittle | 363/21 |
| 5,089,947 | 2/1992 | Driscoll et al. | 363/20 |
| 5,200,886 | 4/1993 | Schwarz et al. | 363/131 |
| 5,459,652 | 10/1995 | Faulk | 363/49 |

*Primary Examiner*—Jeffrey L. Sterrett
*Attorney, Agent, or Firm*—Ratner & Prestia

[57] ABSTRACT

A switching type power supply apparatus decreases the amount of power used in computer and computer peripheral devices by utilizing a switching transistor which is set into switching operation responsive to a pulse signal received from a power source control circuit. This switching transistor controls the voltage applied to the primary winding of the power transformer by the switching transistor, and issues an output voltage from the secondary winding. The power supply apparatus includes a switch circuit which is connected in series to the starting resistor for supplying the output voltage rectified from the AC power source when starting up to the power supply control circuit. The power supply apparatus includes a switch control circuit which turns off the switch circuit when the output voltage rectified from the AC output of the tertiary winding of the power transformer reaches a voltage high enough for stable operation of the power supply control circuit. As a result, the power loss at the starting resistor is curtailed after startup of the switching type power supply apparatus such that the power consumption of the power-saving operation is also curtailed.

2 Claims, 5 Drawing Sheets

POWER SUPPLY WITH SWITCHED STARTING CIRCUIT

BACKGROUND OF THE INVENTION

1. Field of the Invention

The present invention relates to a power source apparatus of computer, display and other computer peripheral devices.

2. Background of the Invention

Recently, in the computer and computer peripheral device market, a power-saving function for decreasing the power consumption of these devices when not in the energized state is desired. In these devices, a switching type power supply apparatus is used. Suppressing the power consumption by several watts by the power-saving function, requires a reduction in the power consumption at the primary side.

Such a power supply apparatus is shown in FIG. 5. FIG. 5 shows a circuit diagram of a conventional switching type power supply device; a stabilizing control circuit for stabilizing the output voltage is omitted.

As shown in FIG. 5, a power supply rectifying diode 1 rectifies an alternating-current (AC) voltage into a direct-current (DC) voltage, and a smoothing capacitor 2 smooths the rectified voltage. A starting resistor 3 supplies this rectified and smoothed voltage to a power supply control circuit 4. The power supply control circuit 4 issues pulse signals, and the base of a switching transistor 5 is connected to this power supply control circuit 4. The primary winding 6a of a power transformer 6 is connected to the collector of the switching transistor 5, thereby supplying the rectified and smoothed voltage. The power transformer 6 possesses secondary winding 6b and tertiary winding 6c aside from the primary winding 6a. A pulse voltage generated in the tertiary winding 6c is rectified and smoothed by a diode 7 and a capacitor 8, and its output voltage is supplied to both ends of the power supply control circuit 4. The pulse voltage generated in the secondary winding 6b is rectified and smoothed by a diode 9 and a capacitor 10, thereby yielding an output voltage.

Explaining the operation, first, when an AC voltage is fed to a terminal a, the AC voltage is rectified and smoothed by the power supply rectifying diode 1 and smoothing capacitor 2, and the voltage at point b is raised. Along with the elevation of the voltage at point b, a voltage is supplied to the power supply control circuit 4 through the starting resistor 3. When the voltage at the power supply terminal c of the power supply control circuit 4 reaches a specific voltage, the power supply control circuit 4 issues a pulse signal, and this pulse signal puts the switching transistor 5 into switching operation. By the switching operation of the switching transistor 5, a pulse voltage is generated in the primary winding 6a of the power transistor 6. As a result, a pulse voltage is generated in the secondary winding 6b and tertiary winding 6c.

The pulse voltage generated in the secondary winding 6b is rectified and smoothed by the diode 9 and capacitor 10, and a DC voltage is supplied to a device (not shown) connected to an output terminal d. The pulse voltage generated in the tertiary winding 6c is rectified and smoothed by the diode 7 and capacitor 8, and a DC voltage is supplied to the power supply terminal c of the power supply control circuit 4. That is, the power source of the power supply control circuit 4 is supplied through the starting resistor 3 at the beginning when AC voltage is applied to the terminal a. After the switching operation of the switching transistor 5 has begun, it is supplied through the tertiary winding 6c of the power transformer 6. However, a current is also flowing in the starting resistor 3 and the electric power is consumed.

For example, suppose AC 240 V is fed to the terminal a, the voltage of the power supply terminal c of the power supply control circuit 4 is 20 V and the resistance value of the starting resistor 3 is 50 kΩ. Ignoring the voltage drop of the power supply rectifying diode 1 and the like, it follows that $$((\sqrt{2} \times 240 \text{ V}) - 20 \text{ V})^2 \div 50 \text{ K}\Omega = 2.04 \text{ W}$$

or about 2 W is always consumed by the starting resistor 3. Although the power loss may be reduced by increasing the resistance value of the starting resistor 3, it takes a longer time until the power supply control circuit 4 is actuated after an AC voltage is applied to the terminal a, and therefore it cannot be increased too much.

In the power-saving function for reducing the power consumption, the power consumption of the device is curtailed by decreasing the power consumption of the device connected to the output terminal d. It is, however, demanded to decrease the power consumption to 5 W to 8 W or less, and the power loss in the starting resistor 3 cannot be ignored.

Thus, in the active state of power supply, the problem was that the starting resistor 3 had a power loss of several watts.

SUMMARY OF THE INVENTION

A switch circuit is connected in series to a starting resistor and a power supply control circuit, and a switch control circuit for on/off control of the switch circuit. The switch control circuit turns off the switch circuit when the output voltage rectified from the AC output of the tertiary winding of a power transformer reaches a voltage for stable operation of the power supply control circuit.

When initiating circuit operation, the switch circuit is closed and a voltage is supplied to the power supply control circuit through the starting resistor. When the power supply control circuit is in the active state or when the power-saving function is in the active state, the switch circuit is opened, thereby curtailing the power loss in the starting resistor and also curtailing the power consumption in the power-saving state.

DESCRIPTION OF THE PREFERRED EMBODIMENTS

Figure 1:
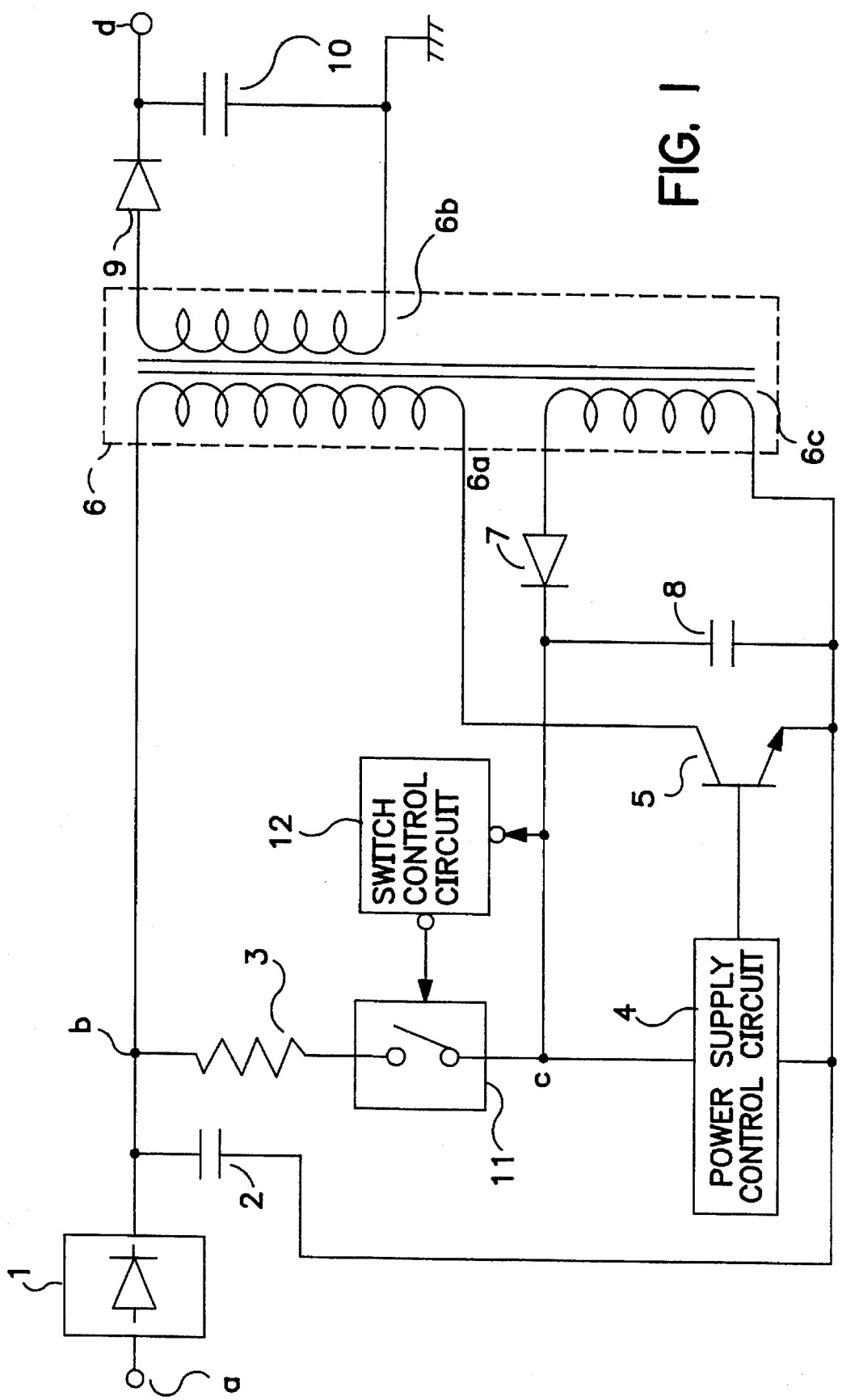
FIG. 1 is a circuit diagram of a power supply apparatus in accordance with a first exemplary embodiment of the invention.

Referring to FIG. 1, a first exemplary embodiment of the invention is described below. Parts similar to those identified with regard to the prior art are identified with the same reference numerals and their explanations are omitted.

FIG. 1 is a circuit diagram of a switching type power supply apparatus in accordance with a first exemplary embodiment of the invention; the stabilizing control unit for stabilizing the output voltage is omitted.

In FIG. 1, a switch circuit 11 is connected in series to a starting resistor 3 and a power supply control circuit 4, and turns on and off the voltage supplied to a power supply terminal c of the power supply control circuit 4. A switch control circuit 12 controls the turning on and off the switch circuit 11. Switch control circuit 12 turns on the switch circuit 11 when voltage is not supplied to the power supply control circuit 4 from the tertiary winding 6c of the power transformer 6, or when the voltage is lower than the level necessary for stable operation of the power supply control circuit 4 if a voltage is supplied to the power supply control circuit 4 from the tertiary winding 6c. Switch control circuit 12 turns off the switch circuit 11 when a voltage high enough for stable operation is supplied to the power supply control circuit 4 from the tertiary winding 6c of the power transformer 6.

When an AC voltage is fed to a terminal a, the AC voltage is rectified and smoothed in the power supply rectifying diode 1 and smoothing capacitor 2, and the voltage at point b increases. At this time, since the switch circuit 11 is turned on, along with the elevation of voltage at point b, a voltage is supplied to the power source control circuit 4 through the starting resistor 3. When the voltage at power supply terminal c of the power supply control circuit 4 reaches a predetermined voltage, the power supply control circuit 4 begins to operate, and the switching transistor 5 is put in switching action by a pulse signal. By the switching action of the switching transistor 5, a pulse voltage is generated at the primary winding 6a of the power transformer 6. As a result, a pulse voltage is generated at secondary winding 6b and tertiary winding 6c. The pulse voltage generated at the secondary winding 6b is rectified and smoothed in a diode 9 and a capacitor 10, and a DC voltage is supplied to a device (not shown) connected to an output terminal d. The pulse voltage generated in the tertiary winding 6c is rectified and smoothed in a diode 7 and a capacitor 8, and a DC voltage is supplied to the power supply terminal c of the power supply control circuit 4. When the voltage at the power supply terminal c of the power supply control circuit 4 reaches a value high enough for stable operation of the power supply control circuit 4, it is detected by a switch control circuit 12, and the switch circuit 11 is turned off. As a result, voltage cannot be supplied from point b to the power supply control circuit 4 through the starting resistor 3.

Thus, according to the exemplary embodiment, which comprises the switch circuit 11 connected in series to the starting resistor 3 and power supply control circuit 4, and the switch control circuit 12 for controlling the turning on or off the switch circuit 11, the switch control circuit 12 turns off the switch circuit 11 when the output voltage rectified from the AC output of the tertiary winding 6c of the power transformer 6 reaches a voltage high enough for stable operation of the power supply control circuit 4. Therefore, when stable operation starts, the electric power supplied from the starting resistor 3 to the power supply control circuit 4 is zero, so that the power loss in the starting resistor 3 is curtailed.

A second exemplary embodiment of the invention is described below with reference to FIG. 2. Parts which are the same as in the first exemplary embodiment are identified with the same reference numerals and their explanations are omitted.

Figure 2:
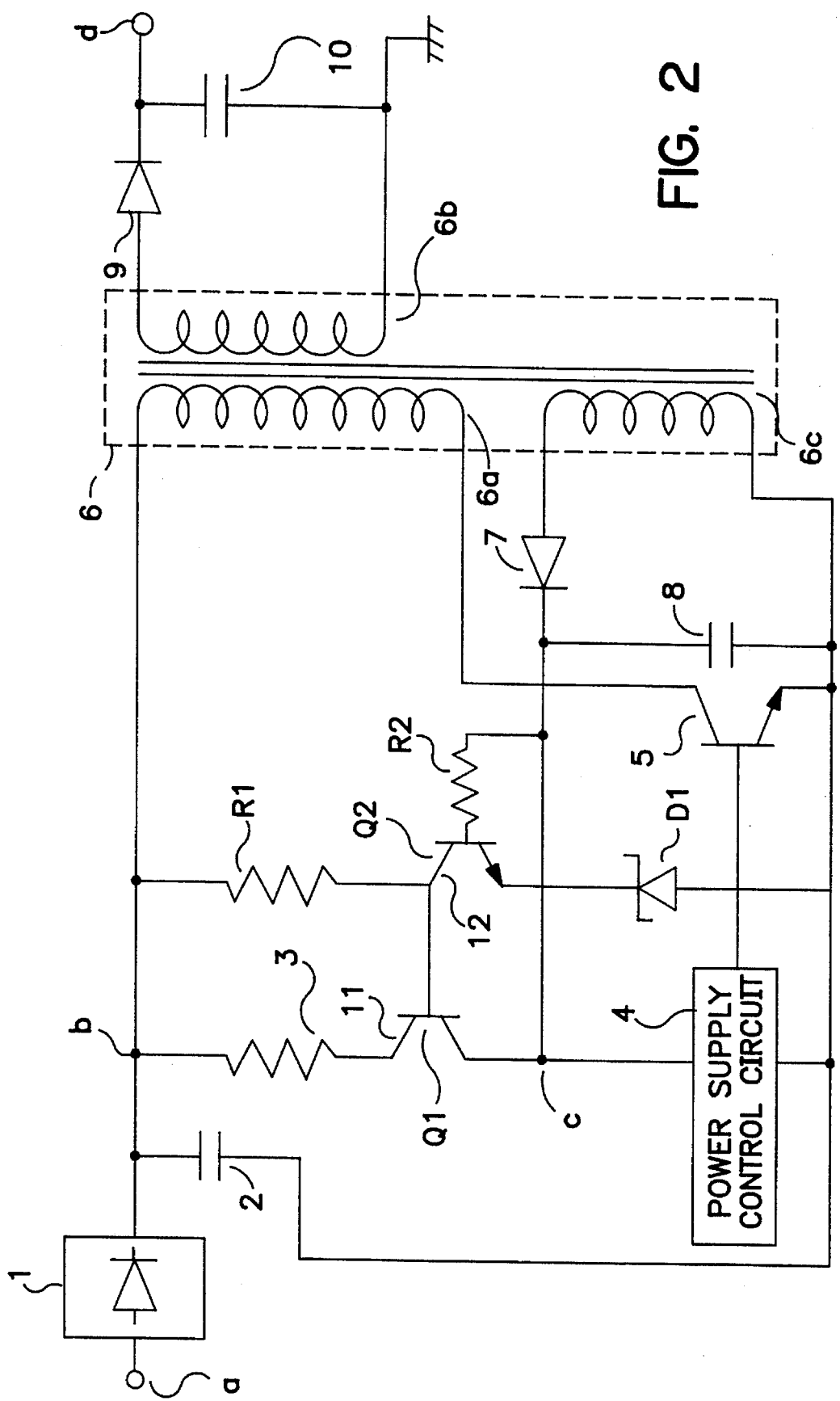
FIG. 2 is a circuit diagram of a power supply apparatus in accordance with a second exemplary embodiment of the invention.

FIG. 2 is a circuit diagram of a switching type power supply apparatus in accordance with a second exemplary embodiment of the invention, and, as in the case of the first exemplary embodiment, the stabilizing control unit for stabilizing the output voltage is omitted.

In FIG. 2, a first transistor Q1 comprises a switch circuit 11. The collector of the first transistor Q1 is connected to a starting resistor 3, its emitter is connected to a power supply terminal c of a power supply control circuit 4, and its base is connected to a terminal b through a resistor R1. The first transistor Q1 turns on and off the voltage supplied to a power supply terminal c of the power supply control circuit 4. A second transistor Q2, resistors R1, R2, and a zener diode D1 comprise a switch control circuit 12 to turn on or off the first transistor Q1. The collector of the second transistor Q2 is connected to the base of the first transistor Q1, the emitter of the second transistor Q2 is connected to the ground side terminal of the power supply control circuit 4 through the zener diode D1, and the base of the second transistor Q2 is connected to the resistor R2 for feeding a base current from the output voltage rectified from the AC output from the tertiary winding 6c of the power transformer 6. Therefore, the first transistor Q1 is turned on when voltage is not supplied to the power supply control circuit 4 from the tertiary winding 6c of the power transformer 6. The first transistor Q1 is turned off when voltage for stable operation is supplied to the power supply control circuit 4 from the tertiary winding 6c of the power transformer 6.

The zener diode D1 has the zener voltage sufficiently higher than the operation starting voltage of the power supply control circuit 4, and lower than the differential voltage of the voltage at terminal c supplied from the power transformer 6 and the base-emitter forward voltage Vbe of the second transistor Q2.

When an AC voltage is supplied to the terminal a, the AC voltage is rectified and smoothed in the power supply rectifying diode 1 and smoothing capacitor 2, and the voltage at point b increases. Along with the elevation of the voltage at point b, a base current is supplied to the first transistor Q1 through the resistor R1. In this manner, the first transistor Q1 is turned on. In the low voltage period of the power supply terminal c of the power supply control circuit 4, the second transistor Q2 is in the off state. As in the first exemplary embodiment, a voltage is supplied to the power supply control circuit 4 through the starting resistor 3, and when the voltage at the power supply terminal c of the power supply control circuit 4 reaches a predetermined voltage, the power supply control circuit 4 begins to operate. By the switching operation of the switching transistor 5, the supply of DC voltage from the tertiary winding 6c of the power transformer 6 to the power supply terminal c of the power supply control circuit 4 is started.

When the voltage at the power supply terminal c of the power supply control circuit 4 exceeds the total voltage of the zener voltage of the zener diode D1 and base-emitter forward voltage Vbe of the second transistor Q2, the second transistor Q2 is turned on. The base voltage of the first transistor Q1 becomes lower than the emitter voltage (voltage at terminal c), and the first transistor Q1 which comprises the switch circuit 11 is turned off. This state is maintained after the voltage at the power supply terminal c of the power supply control circuit 4 has reached a predetermined value.

In the off state of the first transistor Q1, although power is not consumed in the starting resistor 3, power consumption occurs in the resistors R1, R2, the second transistor Q2, and the zener diode D1 which comprise the switch control circuit 12. Supposing the DC current amplification rate hFE of the first transistor Q1 is 100, the value of the resistor R1 may be many times more than the value of the starting resistor 3, even if an allowance is made for sending a sufficient base current to the first transistor Q1. Therefore, as compared with the power consumption at the starting resistor 3, the power consumption at the resistors R1, R2, the second transistor Q2 and the zener diode D1 can be suppressed to be sufficiently small.

Thus, according to this secondary exemplary embodiment, which comprises the first transistor Q1, which acts as the switch circuit 11 connected between the starting resistor 3 and power supply control circuit 4, and the switch circuit 12 which turns on the first transistor Q1 only when starting up and turns the first transistor Q1 off after starting, the power loss in the starting resistor 3 can be curtailed.

A third exemplary embodiment of the present invention is described below while referring to FIG. 3. Parts which are the same as those parts found in the first exemplary embodiment are identified with the same reference numerals and their explanations are omitted.

Figure 3:
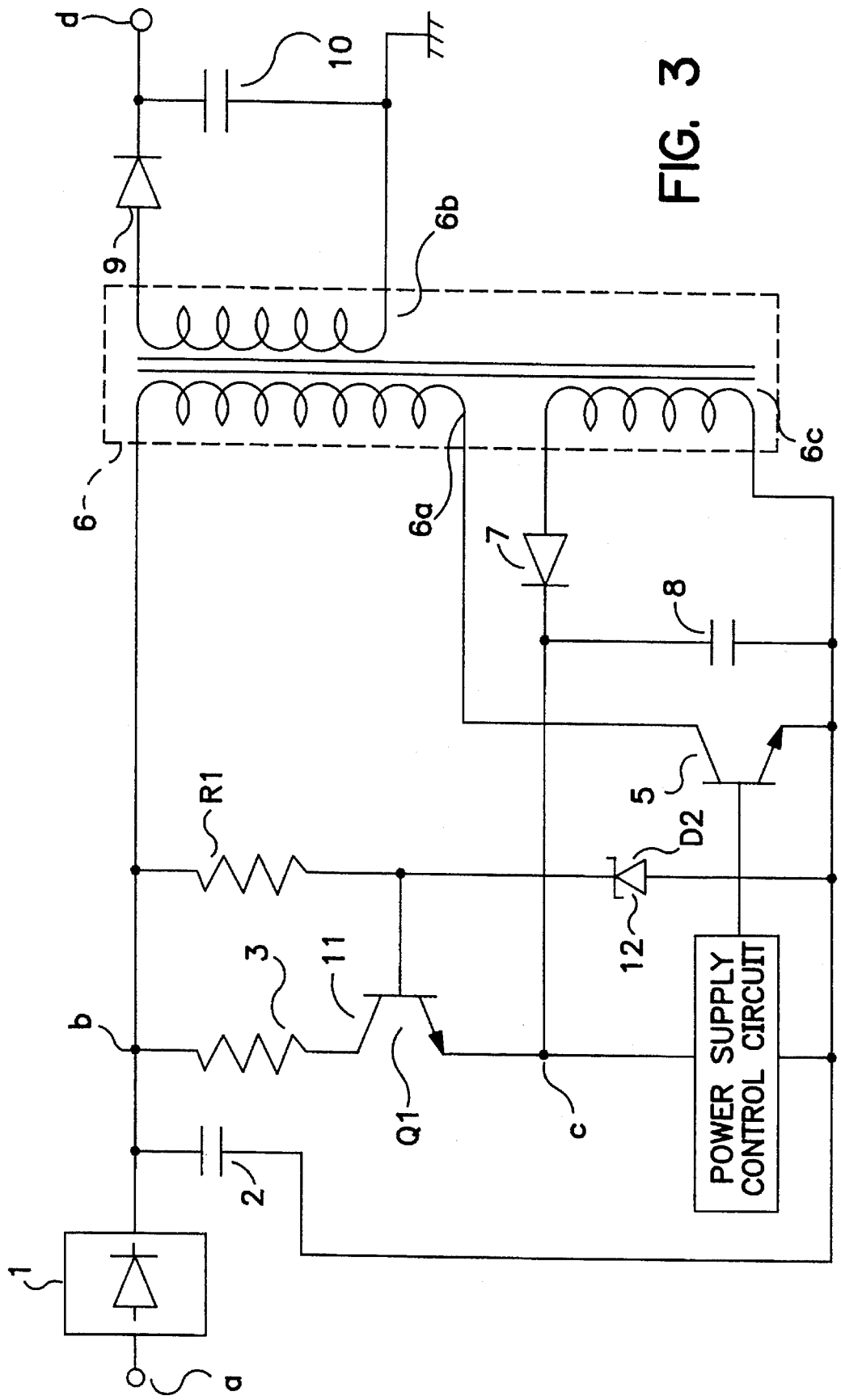
FIG. 3 is a circuit diagram of a power supply apparatus in accordance with a third exemplary embodiment of the invention.

FIG. 3 is a circuit diagram of a switching type power supply apparatus in accordance with the third exemplary embodiment of the invention. As in the first exemplary embodiment, the stabilizing control unit for stabilizing the output voltage is omitted.

In FIG. 3, a first transistor Q1 comprises a switch circuit 11, and the collector of the first transistor Q1 is connected to a starting resistor 3, its emitter is connected to power supply terminal c of a power supply control circuit 4, and its base is connected to terminal b of a resistor R1. The power supply terminal c side of the power supply control circuit 4 is connected and disconnected. The resistor R1 and zener diode D2 comprise a switch control circuit 12 to turn on or off the first transistor Q1. The zener diode D2 is connected between the base of the first transistor Q1 and the ground side terminal of the power supply control circuit 4. The first transistor Q1 is turned on when voltage is not supplied to the power supply control circuit 4 from the tertiary winding 6c of the power transformer 6. The first transistor Q1 is turned off when voltage is supplied to the power supply control circuit 4 from the tertiary winding 6c of the power transformer 6.

The zener diode D2 has the zener voltage sufficiently higher than the operation starting voltage of the power supply control circuit 4, and lower than the total voltage of the voltage at the power supply terminal c of the power supply control circuit 4 supplied from the power transformer 6 and the base-emitter forward voltage Vbe of the first transistor Q1.

When a AC voltage is supplied to the terminal a, the AC voltage is rectified and smoothed by the power supply rectifying diode 1 and smoothing capacitor 2, and the voltage at point b increases. Along with the elevation of the voltage at point b, a base current is supplied to the first transistor Q1 through the resistor R1. In this manner, the first transistor Q1 is turned on. Consequently, as in the first exemplary embodiment, a voltage is supplied to the power supply control circuit 4 through the starting resistor 3. When the voltage at the power supply terminal c of the power supply control circuit 4 reaches a predetermined voltage, the power supply control circuit 4 starts to operate. By the switching action of the switching transistor 5, the supply of DC voltage from the tertiary winding 6c of the power transformer 6 to the power supply terminal c of the power supply control circuit 4 is started.

When the voltage at the power supply terminal c of the power supply control circuit 4 increases to exceed the total voltage of the zener voltage of the zener diode D2 and the base-emitter forward voltage Vbe of the first transistor Q1, the base voltage of the first transistor Q1 becomes lower than the emitter voltage (voltage at terminal c). As a result, the first transistor Q1 which comprises the switch circuit 11 is turned off. This state is maintained after the voltage at the power supply terminal c of the power supply control circuit 4 reaches a predetermined value.

In the off state of the first transistor Q1, power is not consumed in the starting resistor 3, but power consumption occurs in the zener diode D2 which comprises the switch control circuit 11. Supposing, however, the DC current amplification rate hFE of the first transistor Q1 is 100, the value of the resistor R1 may be scores of times more than the value of the starting resistor 3, even if an allowance is made for sending a sufficient base current to the first transistor Q1. Therefore, as compared with the power consumption at the starting resistor 3, the power consumption at the resistor R1 and the zener diode D2 can be suppressed to be sufficiently small.

Thus, according to the third exemplary embodiment, which comprises the first transistor Q1, which acts as the switch circuit 11 connected between the starting resistor 3 and power supply control circuit 4, and the switch control circuit 12 which turns on the first transistor Q1 only when starting up and turns the first transistor Q1 off after starting, the power loss at the starting resistor 3 can be curtailed.

A fourth exemplary embodiment of the present invention is described below with reference to FIG. 4. Parts which are the same in the first exemplary embodiment are identified with the same reference numerals and their explanations are omitted.

Figure 4:
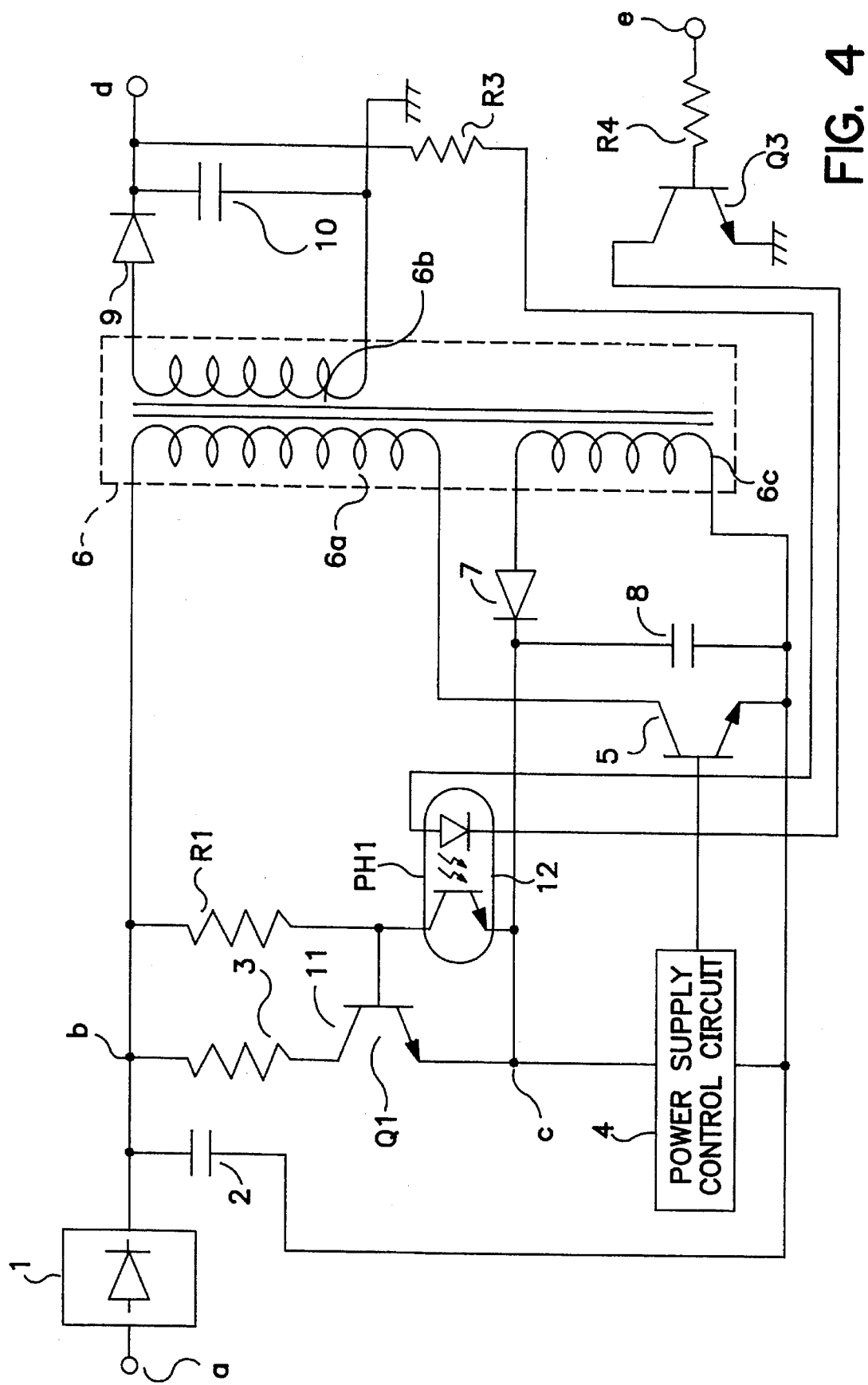
FIG. 4 is a circuit diagram of a power supply apparatus in accordance with a fourth exemplary embodiment of the invention.
Figure 5:
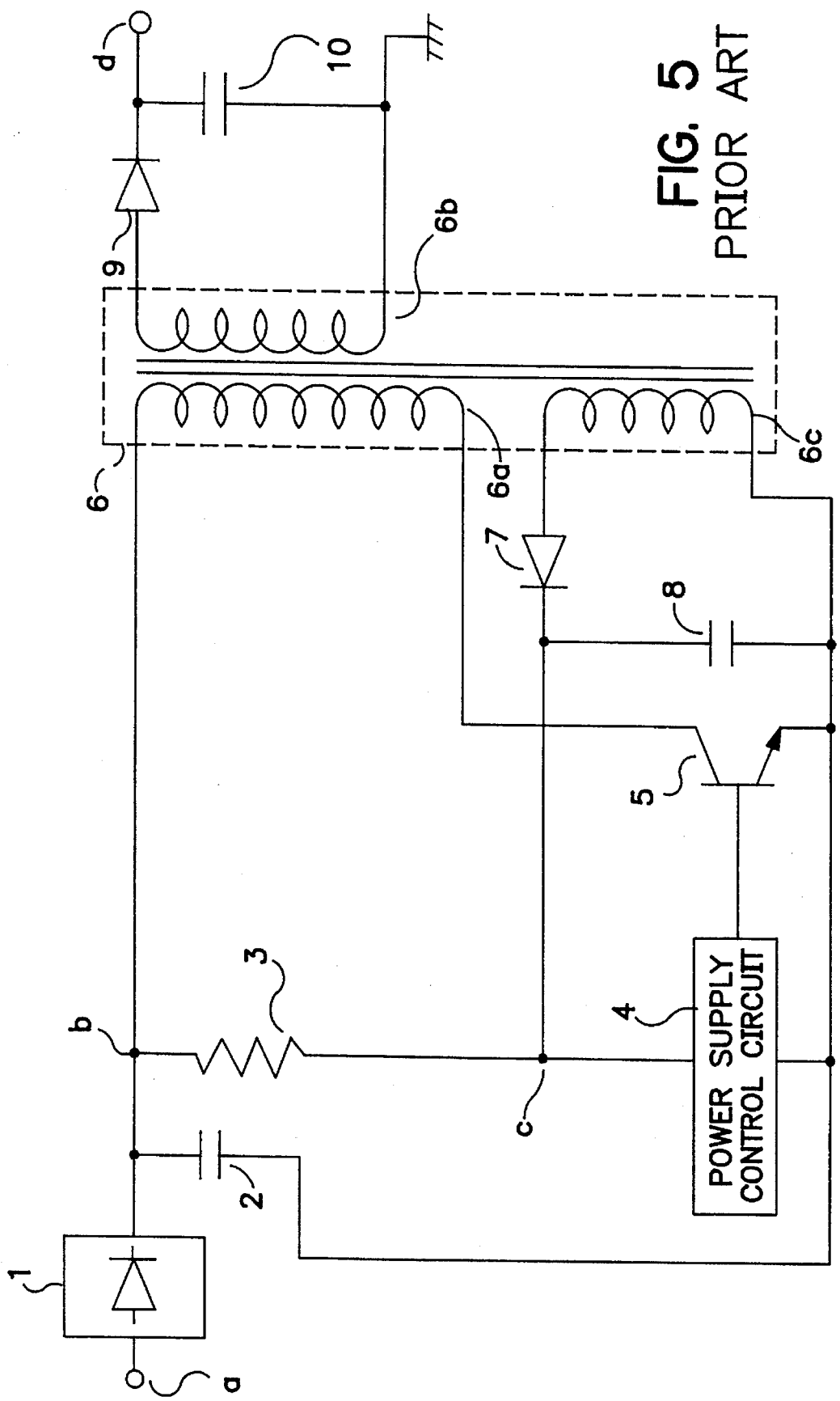
FIG. 5 is a circuit diagram of a conventional power supply apparatus.

FIG. 4 is a circuit diagram of a switching type power supply apparatus in accordance with the fourth exemplary embodiment of the present invention. As in the first exemplary embodiment, the stabilizing control unit for stabilizing the output voltage is omitted.

In FIG. 4, a first transistor Q1 comprises a switch circuit 11, and the collector of the first transistor Q1 is connected to a starting resistor 3, its emitter is connected to a power supply terminal c of a power supply control circuit 4, and its base is connected to a terminal b through a resistor R1. The first transistor Q1 turns on and off the voltage supplied to a power supply terminal c of the power supply control circuit 4. Resistors R1, R3, R4, photo isolator PH1, and third transistor Q3 comprise a switch control circuit 12 to turn on and off the first transistor Q1. The collector of the transistor of the photo isolator PH1 is connected to the base of the first transistor Q1, and the emitter of the transistor of the photo isolator PH1 is connected to the power supply terminal c of the power supply control circuit 4. The first transistor Q1 is turned on when voltage is not supplied to the power supply control circuit 4 from the tertiary winding 6c of the power transformer 6. The first transistor Q1 is turned off when voltage is supplied to the power supply control circuit 4 from the tertiary winding 6c of the power transformer 6. Based on the output voltage of the secondary winding 6b of the power transformer 6, the first transistor Q1 is turned on or off.

When an AC voltage is supplied to terminal a, the AC voltage is rectified and smoothed by the power supply rectifying diode 1 and smoothing capacitor 2, and the voltage at point b increases. Along with the elevation of the voltage at point b, a base current is supplied to the first transistor Q1 through the resistor R1, and therefore, the first transistor Q1 is turned on. The third transistor Q3 remains in the off state until a voltage is generated at output terminal d and a voltage is applied to terminal e. Hence, as in the first exemplary embodiment, a voltage is supplied to the power supply control circuit 4 through the starting resistor 3. When the voltage at the power supply terminal c of the power supply control circuit 4 reaches a predetermined voltage, the power supply control circuit 4 begins to operate. By the switching action of the switching transistor 5, a DC voltage is supplied to a circuit (not shown) connected to the output terminal d from the secondary winding 6b and tertiary winding 6c of the power transformer 6, and the power supply terminal c of the power supply control circuit 4, so that the power supply apparatus achieves stable operation. During this time, voltage is not applied to terminal e.

While changing to low power consumption mode in the power-saving operation, when a sufficient voltage for turning on the third transistor Q3 is applied to the terminal e, a current flows in the diode of the photo isolator PH1. In consequence, the transistor of the photo isolator PH1 is turned on, and the base voltage of the first transistor Q1 decreases, thereby turning off the first transistor Q1 which comprises the switch circuit.

When the first transistor Q1 is in the off state, power is not consumed in the starting resistor 3, but power consumption occurs in the resistors R1, R3, R4, in the photo isolator PH1, and in the third transistor Q3 which comprises the switch control circuit 12. However, for the same reason as in the second exemplary embodiment, as compared with the power consumption at the starting resistor 3, the power consumption at the switch control circuit 12 can be suppressed to be sufficiently small.

Thus, according to the fourth exemplary embodiment, which comprises the first transistor Q1, which acts as the switch circuit 11 connected between the starting resistor 3 and power supply control circuit 4, and the switch control circuit 12 which turns on or off the first transistor Q1, the power loss at the starting resistor 3 can be curtailed, so that the power consumption in the power-saving operation can be curtailed.

What is claimed:

1. A power supply apparatus for use with an AC power source comprising:

a switching transistor for performing a switching operation responsive to a pulse signal received from a power supply control circuit;

a power transformer comprised of a primary winding, a secondary winding, and a tertiary winding, wherein a voltage is applied to the primary winding by the switching transistor and the power transformer produces an output voltage responsive to said voltage applied to the primary winding;

a starting resistor for supplying a further output voltage rectified from said AC power source when starting the power supply control circuit;

a switch circuit connected in series to the starting resistor and the power supply control circuit; and a switch control circuit for turning on and turning off the switch circuit wherein the switch control circuit turns off the switch circuit when the output voltage rectified from an AC output of the tertiary winding of the power transformer reaches a voltage for stably operating the power supply control circuit, wherein the switch circuit is comprised of a first transistor of which a collector of said first transistor is connected to the starting resistor, an emitter of said first transistor is connected to a power supply terminal of the power supply control circuit, and a base of said first transistor is connected to the switch control circuit; and the switch control circuit is comprised of a second transistor of which the collector of said second transistor is connected to the base of the first transistor, the emitter of said second transistor is connected to a ground side terminal of the power supply control circuit, and the base of said second transistor is connected to the power supply control circuit for supplying a base current from the output voltage of the tertiary winding of the power transformer.

2. A power supply apparatus for use with an AC power source comprising:

a switching transistor for performing a switching operation responsive to a pulse signal received from a power supply control circuit;

a power transformer comprised of a primary winding, a secondary winding, and a tertiary winding, wherein a voltage is applied to the primary winding by the switching transistor and the power transformer produces an output voltage responsive to said voltage applied to the primary winding;

a starting resistor for supplying a further output voltage rectified from said AC power source when starting the power supply control circuit;

a switch circuit connected in series to the starting resistor and the power supply control circuit; and a switch control circuit for turning on and turning off the switch circuit wherein the switch control circuit turns off the switch circuit when the output voltage rectified from an AC output of the tertiary winding of the power transformer reaches a voltage for stably operating the power supply control circuit, wherein the switch circuit is comprised of a first transistor of which a collector of said first transistor is connected to the starting resistor, an emitter of said first transistor is connected to a power supply terminal of the power supply control circuit, and a base of said first transistor is connected to the switch control circuit; and the switch control circuit is comprised of a photo isolator of which the collector of said photo isolator is connected to the base of the first transistor, and the emitter of said photo isolator is connected to the power supply terminal of the power supply control circuit thereby turning on and turning off the first transistor based on the output voltage of the secondary winding of the power transformer.

* * * * *